March 4, 1969  R. A. WOODARD  3,430,374
EMERGENCY SIGNAL FOR AUTOMOTIVE VEHICLES
Filed Nov. 15, 1966
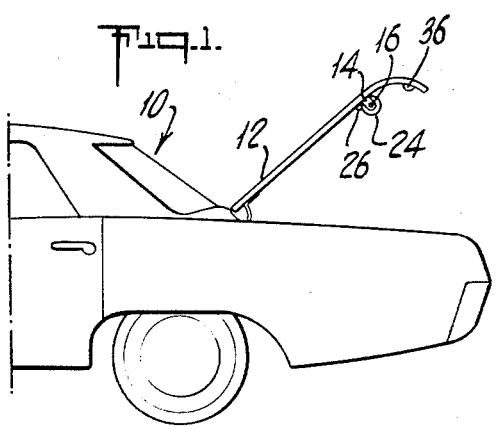
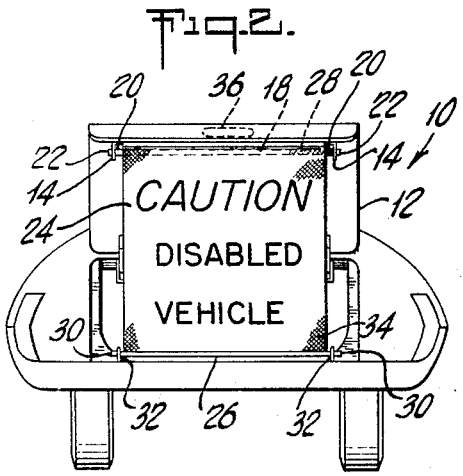
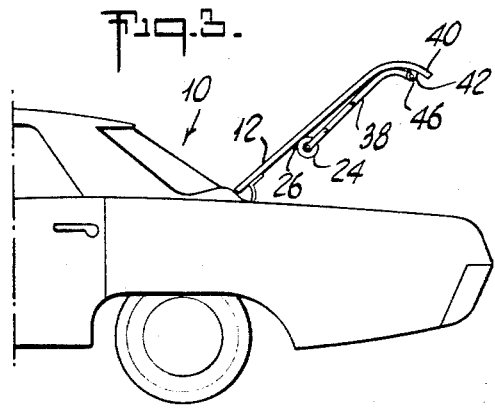
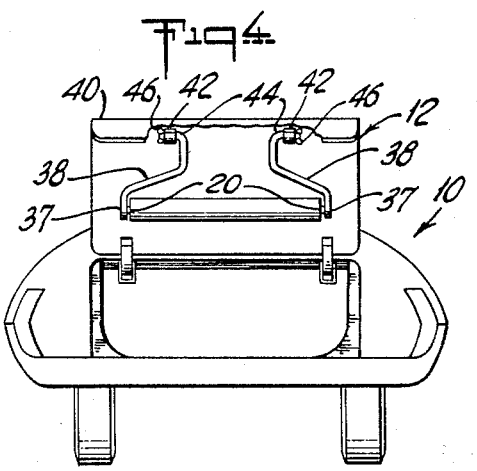
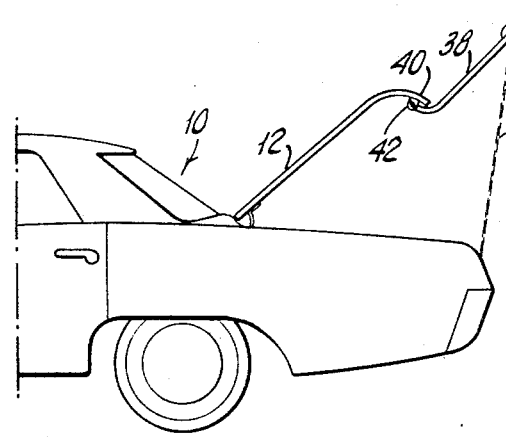
INVENTOR
ROBERT A. WOODARD
BY
Eyre, Mann & Lucas
ATTORNEYS United States Patent Office 3,430,374
Patented Mar. 4, 1969

3,430,374
EMERGENCY SIGNAL FOR AUTOMOTIVE
VEHICLES
Robert Woodard, Garden City, N.Y., assignor of one-
half to Berj A. Terzian, Ossining, and William D. Lucas,
Scarsdale, N.Y.
Filed Nov. 15, 1966, Ser. No. 594,455
U.S. Cl. 40—129                                    4 Claims
Int. Cl. G09f 7/00, 11/24

ABSTRACT OF THE DISCLOSURE

An emergency signal for an automotive vehicle consists of a flexible sheet stored adjacent the underside of the trunk compartment lid of the vehicle. When the trunk compartment lid is raised, the sheet may be extended into a vertical position and has a precautionary message on its side exposed to the view of oncoming traffic. Means are provided to position the uppermost portion of the extended sheet higher than the raised trunk compartment lid to give a larger precautionary message that can be seen and understood from greater distances.

---

This invention relates to an emergency signal for automotive vehicles.

A stationary, disabled vehicle, on or adjacent modern high speed roads, constitutes a serious hazard to the safety of its passengers as well as those of approaching vehicles inasmuch as it increases the likelihood of a collision or some such accident. In order to give warning of this hazard, various signalling devices are currently available nearly all of which rely upon lights of one kind or another, e.g. flares, revolving beacons, flashing lights, blinkers, etc.

Such expedients constitute something less than the ideal signal for two basic reasons, viz. (1) they lack 100% reliability and (2) need to be interpreted. Many of the above-noted signal light devices operate on battery power which imposes a maintenance burden on the user to check the battery and make certain it has not become depleted. All too frequently this is neglected with the potentially disastrous result that due to dead batteries, a signal cannot be given in an emergency. Even the 4-way flasher, now mandatory on all automotive vehicles, may not be operable for signalling purposes because of a previously-undetected defect in the flasher or in its associated circuit, or because of damage to the electrical system of the vehicle as a result of the very emergency itself which has made a warning signal necessary. Thus, conventional signals based on lights do not constitute a guarantee that a warning signal will be available at every occasion of need and in that respect are inadequate.

Another objection involves the fact that flashing lights in effect comprise a message in code which the on-coming driver not only must see but also interpret in order to decide that the lights signify an emergency. In the total experience of driving, flashing lights are frequently encountered in circumstances other than that of a disabled vehicle, e.g. the lights of turn indicator signals, ambulances, police cars, tow trucks, construction work areas, road repair areas, traffic signals, etc. Accordingly, when a driver sees a flashing light intended to be an emergency signal, particularly at night, his mind must consider and reject all of these other possibilities before reaching the conclusion that it is a disabled vehicle which confronts him. Only after reaching that conclusion does the driver take any, or at least the most appropriate and effective, precautionary measures to avoid a collision. The interval of delay, during which depending on the surrounding circumstances the driver experiences uncertainty, apprehension and even alarm, short as it may be, may mean the difference between having and avoiding an accident.

These deficiencies of conventional light signals are eliminated by the present invention which provides an emergency signal for automotive vehicles which does not require any maintenance and which advises on-coming drivers of an emergency situation with a written, instantly understandable message of caution. More particularly, the signal of the invention comprises a flexible sheet which is mounted in normally rolled or collapsed condition under spring tension adjacent an interior wall of the trunk compartment of the vehicle, and preferably adjacent the underside of the trunk compartment lid, where it is unobtrusive and readily stored. The sheet is provided with a message of caution on that side of it which when unrolled faces on-coming traffic and also with means for securing its lower edge to the lower portion of the trunk compartment space or to any other suitable part on the lower body of the vehicle. In an emergency situation, the trunk compartment lid is raised, the sheet is unrolled against its spring tension and the lower edge secured to the lower body of the vehicle, whereby the precautionary message is placed in the view of on-coming drivers. When the emergency ceases, the sheet is simply rolled back up into the trunk compartment lid for storage and reuse whenever it should be needed again.

The effectiveness of the signal of the invention naturally increases as the distance at which its message may be seen and understood increases. The raised trunk compartment lid of a vehicle and the floor of the trunk or lower body of the vehicle provide a considerable vertical and horizontal span for a flexible sheet having a precautionary message in sufficiently large letters for legibility from a distance which gives an excellent margin of safety. However, in order to increase the safety margin even more, visibility aids are used in preferred embodiments of the invention. For example, the lettering of the message and the background of the flexible sheet are given highly contrasting colors applied in the form of luminescent paints or coatings which increase the daytime visibilty of the signal considerably. In addition, the entire sheet may be coated with small glass beads to reflect the headlamps of approaching vehicles and thereby increase the nighttime visibility of the signal. As still another aid, a small lamp connected to the battery of the vehicle can be installed in the trunk compartment lid to illuminate the glass beaded sheet and thereby provide maximum nighttime visibility.

In another preferred embodiment of the invention, the rolled flexible sheet is mounted for storage on pivotable arms which extend along the underside of the trunk compartment lid back towards the rear edge of the lid and terminate at a pivot point just short of the rear edge. In this way, the arms can be pivoted out beyond the raised rear edge of the trunk compartment lid to lift the rolled sheet to a much higher vertical position and thereby increase its vertical span when the sheet is extended down to signal-giving position. This in turn permits use of still larger letters for the precautionary message and, in combination with the above-mentioned visibility aids, makes the signal legible from a very great distance for maximum safety.

In addition to the advantages previously mentioned for the signal of the invention, other benefits reside in the fact that the flexible sheet is stored in a protected closed space where weather or the elements cannot deteriorate it. Also, when installed, the sheet becomes an integral part of the vehicle and thus cannot be forgotten or left behind. A very important feature is the fact that when the sheet is used to give a message of caution which includes a note of command, e.g., "Caution, Disabled Vehicle" or "Reduce Speed" or "Emergency, Go Slow," there is the important effect of virtually instantaneous precautionary action on the part of on-coming drivers due to an instinctive reflex-like reaction to obey such authoritative admonitions in the always potentially hazardous environment of modern vehicular transportation. Thus, by its written message, the signal of the invention gives both an explanation and reassurance to on-coming drivers to dispel any apprehension or hesitancy they would otherwise experience from a stalled vehicle.

Further details of the invention will be readily understood from the accompanying drawings which illustrate several embodiments thereof and of which:

FIG. 1 is a side view of the rear portion of a vehicle having the signal device of the invention attached thereto, FIG. 2 is a rear view of the vehicle portion of FIG. 1 with the signal device extended into a signal-giving position, FIG. 3 is a side view similar to that of FIG. 1 showing another embodiment of the invention wherein the signal device is mounted on pivotable arms, FIG. 4 is a bottom plan view of the trunk compartment lid of FIG. 3, and FIG. 5 is a side view similar to that of FIG. 3 wherein the signal device has been pivoted into signal-giving position.

Referring now to FIG. 1, reference numeral 10 denotes the rear portion generally of an automotive vehicle with a trunk compartment lid 12 which is shown in raised position. Attached to the underside of the lid 12 are a pair of bracket arms or tabs 14 each having a hole 16. A horizontal bar 18 extends between the arms 14 and a pin 20 projects out from each end of bar 18. The pins 20 are mounted within the holes 16 whereby the bar 18 is free to rotate about its central axis. The ends of the pins 20 are enlarged by means of caps 22 threaded thereon to prevent the pins from accidentally dropping out of holes 16.

One end of a flexible sheet 24 is attached to the bar 18 and the other end to a similar bar 26 the length of which is slightly greater than the horizontal distance between the bracket arms 14. A spring 28 is attached to one of the arms 14 and to the bar 18 and normally biases the sheet 24 to roll up upon bar 18 for storage of the sheet in the position shown in FIG. 1 adjacent the underside of trunk compartment lid 12. In this connection, the ends 30 of bar 26, being longer than the distance between arms 14, cannot pass through that distance and thus act as stops to maintain the rolled-up sheet 24 in the stored position under spring tension.

The bar 26 by means of its ends 30 cooperates with eye loops 32 which are attached to the floor of the trunk compartment of the vehicle. As shown in FIG. 2, that side of the unrolled sheet 24 which faces traffic approaching from the rear is provided with a precautionary message reading "Caution Disabled Vehicle." The letters of this message are applied to the sheet 24 with a luminescent paint in a color which contrasts sharply with the color of the remaining background of the sheet which also is coated with luminescent paint. For example, the letters may be orange in contrast to a green background, or yellow against a black background, etc., and luminescent paints in such contrasting colors are available as standard commercial products. In addition, the message side of the sheet 24 is coated with a layer of small transparent glass beads 34 which are applied over the luminescent letters and background.

As shown in full FIG. 1, and by the dotted lines in FIG. 2, a lamp 36 is positioned in the underside of the lid 12 so as to illuminate the sheet 24 when it is extended to signal-giving position. This lamp is connected to the vehicle battery and may be provided with a manual on-off switch or an automatic switch which will turn on the lamp each time the lid 12 is opened or a combined automatic-manual cancel switch, all of which details are conventional and need not be illustrated for an understanding of the present invention.

As will be evident, the sheet 24 is normally stored in the collapsed position of FIG. 1 as an integral part of the vehicle. Upon any emergency which causes the vehicle to remain stationary on or adjacent a road, the lid 12 is raised, the bar 26 pulled down and the ends 30 thereof secured in the eye loops 32. This places the sheet 24 in its signal-giving position of FIG. 2 where its precautionary message is exposed to the view of all traffic approaching from the rear. If the emergency occurs at night, the lamp 36 may be used to illuminate the exposed side of the sheet 24 to materially increase the distance at which it may be seen and read, this effect being amplified by the reflective glass beads 34. The bars 18 and 26 rigidify the top and bottom edges of the sheet 24 to maintain it in a substantially flat vertical plane even in strong winds.

It will be noted that the vertical and horizontal dimensions of the unfurled sheet 24 are such that the sheet occupies substantially all of the vertical plane bounded by the visible perimeters of the raised lid 12 and other parts of the vehicle defining the trunk compartment. This is done to spread the precautionary message across the maximum possible area within the limits of the rear configuration of the vehicle and thereby achieve legibility at the farthest possible distance from the vehicle.

In the embodiment of the invention shown in FIGS. 3, 4 and 5, the precautionary message is spread across an area which is extended beyond the limits of the rear configuration of the vehicle for even greater legibility. All of the parts of this second embodiment are the same as that shown in FIGS. 1 and 2 except that the pins 20, instead of being mounted in arms 14, are rotatably supported in holes 37 of a pair of elongated curved arms 38 which extend along the underside of lid 12 toward its rear edge 40. Mounted adjacent the edge 40 are a pair of cylindrical supports 42 through which pass rod-like tips 44 of the arms 38. Thus, the tips 44 are free to rotate within the supports 42. The free ends of the tips 44 projecting out from supports 42 are provided with wing lock nuts 46 threaded thereon.

Normally, the arms 38 are locked in the position shown in FIG. 3 whereby the rolled-up sheet 24 is stored adjacent the underside of trunk compartment lid 12. When an emergency signal becomes necessary, the lid 12 is opened, the wing nuts 46 are loosened to allow the arms 38 to pivot in counterclockwise direction out beyond the rear edge 40 of the lid to the position shown in FIG. 3 and the arms are locked in that position by tightening of the nuts 46. As will be evident, the sheet 24 may now be extended down from a much greater height to signal-giving position as compared to the embodiment shown in FIGS. 1 and 2. As a result, a larger sheet and correspondingly larger letters may be used to expose a precautionary message which can be seen and read from a still farther distance by on-coming drivers. This added advantage is achieved without sacrificing the other benefits of being readily storable in an unobtrusive location as an integral part of the vehicle with protection from the weather and elements.

In addition, the embodiment of the invention illustrated in FIGS. 3, 4 and 5 may be used in station wagons and trucks which do not have a raisable trunk compartment lid. Thus, in station wagons, the rolled sheet 24 and pivotable arms 38 may be recessed into the underside of the roof at the rear of the vehicle and pivoted out through the opening of the rear window into a signal-giving position, with the lower bar 26 being secured to the rear bumper or some other suitable part of the lower body. The same arrangement may be used for trucks which have doors or like parts which expose openings at the rear of the vehicle.

Various other changes and modifications may be used in practicing the invention. For example, the signal devices shown in the drawings also can be mounted adjacent the underside of the engine compartment lid of a vehicle whereby precautionary messages can be given to traffic approaching from the front and rear of a disabled vehicle. Another alternative is to mount the rolled sheet 24 for storage in a trough in the floor of the trunk compartment whereby the sheet is lifted and secured to the raised trunk compartment lid for the signal-giving position instead of the converse as described in connection with the drawings. Also, the signal device of the invention may be readily installed as original equipment or as a separately-added accessory.

It will be understood that it is intended to cover all changes and modifications of the preferred embodiments of the invention, herein chosen for the purpose of illustration, which do not depart from the spirit and scope of the invention.

What is claimed is:

1. An emergency signal for automotive vehicles which comprises at least one flexible sheet, means for storing said sheet within a rear trunk compartment of said vehicle, means for extending said sheet from its storage position into a signalling position after a covering lid of said trunk compartment is raised, said sheet being oriented in said signalling position in a substantially vertical plane with one of its sides exposed to view from the rear of said vehicle and said exposed side having a message of caution thereon, and said extending means including means for positioning the uppermost portion of said sheet higher than said raised trunk compartment lid while in said signalling position.

2. An emergency signal as in claim 1 wherein said sheet is stored in the form of a roll adjacent the underside of a trunk compartment lid of said vehicle, said roll being rotatable to permit said sheet to be unrolled and thereby extended into said signalling position after said lid is raised.

3. An emergency signal as in claim 2 wherein said rolled sheet is rotatably mounted between two arms which extend back along the underside of said lid to a point adjacent the rear edge of said lid, means for pivoting said arms at said point whereby said arms may be pivoted out beyond said rear edge after said lid is raised to increase the height to which said rolled sheet is lifted, and means for locking said arms in the storage position and in the position of increased height.

4. An emergency signal as in claim 1 wherein the upper and lower edges of said sheet are attached to rigid rods to aid in maintaining said sheet oriented in a substantially flat, vertical plane when extended into said signalling position.

References Cited

UNITED STATES PATENTS 2,432,928  12/1947  Palmquist _____ 40—135
3,255,725  6/1966  Von Kreidner et al. __ 40—129 X

OTHER REFERENCES

Page 187, "Popular Science," August 1964.

EUGENE R. CAPOZIO, *Primary Examiner.*

W. J. CONTRERAS, *Assistant Examiner.*

U.S. Cl. X.R.

40—82